(12) United States Patent
Roy et al.

(10) Patent No.: US 9,473,730 B1
(45) Date of Patent: Oct. 18, 2016

(54) METHOD AND SYSTEM FOR PERSONALIZED RECOMMENDATION MODELING

(75) Inventors: Sujoy Roy, Singapore (SG); Wei Yun Yau, Singapore (SG); Xianjun Wang, Singapore (SG); Qing'An Li, Singapore (SG); Sheau Ng, Wayland, MA (US)

(73) Assignees: NBCUniversal Media, LLC, New York, NY (US); Agency for Science, Technology and Research, Singapore (SG)

( * ) Notice: Subject to any disclaimer, the term of this patent is extended or adjusted under 35 U.S.C. 154(b) by 160 days.

(21) Appl. No.: 13/372,104

(22) Filed: Feb. 13, 2012

(51) Int. Cl.
| | |
|---|---|
| *H04H 60/32* | (2008.01) |
| *H04H 60/33* | (2008.01) |
| *H04H 60/45* | (2008.01) |
| *H04H 60/56* | (2008.01) |
| *H04N 5/445* | (2011.01) |
| *H04N 7/173* | (2011.01) |
| *H04N 21/442* | (2011.01) |
| *H04H 60/66* | (2008.01) |
| *H04N 21/482* | (2011.01) |
| *H04H 60/43* | (2008.01) |
| *H04N 21/258* | (2011.01) |
| *H04N 21/45* | (2011.01) |

(52) U.S. Cl.
CPC .......... *H04N 5/44543* (2013.01); *H04H 60/32* (2013.01); *H04H 60/33* (2013.01); *H04H 60/43* (2013.01); *H04H 60/45* (2013.01); *H04H 60/66* (2013.01); *H04N 7/17309* (2013.01); *H04N 7/17318* (2013.01); *H04N 21/25891* (2013.01); *H04N 21/44222* (2013.01); *H04N 21/4532* (2013.01); *H04N 21/482* (2013.01)

(58) Field of Classification Search
None
See application file for complete search history.

(56) References Cited

U.S. PATENT DOCUMENTS

| | | | | |
|---|---|---|---|---|
| 5,983,214 | A * | 11/1999 | Lang et al. | |
| 6,029,195 | A * | 2/2000 | Herz | G06F 17/30867 |
| | | | | 348/E7.056 |
| 6,757,691 | B1 * | 6/2004 | Welsh | G06Q 30/02 |
| 6,904,408 | B1 * | 6/2005 | McCarthy | A61B 5/6815 |
| | | | | 705/2 |
| 7,017,172 | B2 * | 3/2006 | Schaffer | H04N 7/163 |
| | | | | 348/E5.006 |
| 7,966,632 | B1 * | 6/2011 | Pan et al. | 725/46 |
| 8,484,675 | B2 * | 7/2013 | Coppens | H04N 7/17318 |
| | | | | 725/32 |

(Continued)

*Primary Examiner* — Jonathan V Lewis

(57) ABSTRACT

A method and system for modeling the interests of an individual television viewer based on logging the user's television usage activities for the purpose of determining personalized recommendations is presented. According to one aspect of the claimed subject matter, user input in response to a questionnaire, the user's recorded television usage, the user's previous interactions with the personalized recommendations and contextual data such as external events and social group influences are used to model the probability of a user's interest in available media content. Data from the model is subsequently arranged to display units of available media content with the highest probabilities of user interest to the user. According to further embodiments, specific user behavior in previously consumed media content such as a user's selection, a user's continuous consumption, and a user's discontinuation of consumption is tracked and used as input.

32 Claims, 8 Drawing Sheets

(56) References Cited

U.S. PATENT DOCUMENTS

| | | | | |
|---|---|---|---|---|
| 8,560,453 | B2* | 10/2013 | Pendakur | G06Q 30/0241 705/14.4 |
| 8,787,724 | B2* | 7/2014 | Ohde | H04N 5/44543 386/248 |
| 9,232,273 | B2* | 1/2016 | Begeja | G11B 27/11 |
| 2002/0056109 | A1* | 5/2002 | Tomsen | 725/60 |
| 2002/0108113 | A1* | 8/2002 | Schaffer et al. | 725/46 |
| 2006/0020973 | A1* | 1/2006 | Hannum | H04N 5/44543 725/46 |
| 2007/0174862 | A1* | 7/2007 | Kushida | H04H 60/33 725/15 |
| 2007/0288965 | A1* | 12/2007 | Murakami et al. | 725/46 |
| 2008/0104624 | A1* | 5/2008 | Narasimhan et al. | 725/13 |
| 2008/0127275 | A1* | 5/2008 | Tang et al. | 725/56 |
| 2008/0134248 | A1* | 6/2008 | Matsuda et al. | 725/46 |
| 2008/0148317 | A1* | 6/2008 | Opaluch | 725/46 |
| 2009/0083796 | A1* | 3/2009 | Karasudani et al. | 725/39 |
| 2009/0125937 | A1* | 5/2009 | Verhaegh | 725/38 |
| 2009/0265245 | A1* | 10/2009 | Wright | G06Q 30/02 705/14.66 |
| 2009/0271826 | A1* | 10/2009 | Lee et al. | 725/46 |
| 2010/0064325 | A1* | 3/2010 | Fishman | H04N 7/17318 725/61 |
| 2010/0071005 | A1* | 3/2010 | Kusunoki | G06F 17/30781 725/46 |
| 2010/0251305 | A1* | 9/2010 | Kimble | H04N 7/17318 725/46 |
| 2012/0198487 | A1* | 8/2012 | Suzuki et al. | 725/13 |
| 2012/0303600 | A1* | 11/2012 | Mukhopadhyay et al. | 707/706 |
| 2013/0185750 | A1* | 7/2013 | Ayoub | 725/34 |

* cited by examiner

| | | |
|---|---|---|
| Select | S1: Follow up of a Series / Event | Explict |
| | S2: VOD: Searched and selected content | Explict |
| | S3: Previously recorded | Explict |
| | S4: Always watches this regularly scheduled show | Explict |
| | S5: VOD: Selected content from recommended/popular | Implicit |
| | S6: The Groups which the user belongs to has interest | Implicit |
| | S7: LIVE telecast event | Implicit |
| | S8: The content is related to a recent external event | Implicit |
| | S9: The content was recommended by friends | Implicit |
| | S10: Serendipitous: Content selected was unexpected | Implicit |
| | S11: Show on favorite channel | Implicit |
| Watch | W1: Like | Explict |
| | W2: Recorded show while watching | Explict |
| | W3: Rewinded show | Explict |
| | W4: Watched the show/movie again | Explict |
| | W5: Shared with friends | Explict |
| | W6: VOD: Content metadata match user profile | Implicit |
| | W7: Content metadata is liked by the user | Implicit |
| | W8: No alternative with higher predicted interest | Implicit |
| | W9: Usual time to watch the channel | Implicit |
| | W10: User's characteristics match content metadata | Implicit |
| Leave | L1: Dislike | Explict |
| | L2: Change of user or logged off system | Explict |
| | L3: Never watches TV during this time | Implicit |
| | L4: Switched to favorite channel | Implicit |
| | L5: VOD: Performed FWD many times before quitting | Implicit |
| | L6: Looking for something outside present content | Implicit |
| | L7: Content available for later viewing | Implicit |
| | L8: Switched to Live show | Implicit |
| | L9: Switched to Group interest show | Implicit |
| | L10: Switched to content recommended by friends | Implicit |

| Questions | Classification |
|---|---|
| Q1. How do you prefer to spend your free time? | Ratings |
| (a) together with friends | |
| (b) spending time with family | |
| (c) alone / studying | |
| (d) surfing the Internet or social networking sites | |
| Q2. What kind of books do you like to read (1-5)? | Genre |
| (a) (Auto)biographies | |
| (b) Science Fiction | |
| (c) Comics / Graphic Novels | |
| (d) Crime / Mystery Novels | |
| (e) History and Culture Nonfiction | |
| (f) Academic / Textbooks | |
| Q3. What are some of the most common reasons why you choose to watch a movie (1-5)? | Combining Classifications |
| (a) Recommended by friend | |
| (b) Highly rated / popular | |
| (c) Won an academy award | |
| (d) Has a favorite actor/actress/director | |
| (e) Depends on with whom I am watching TV | |
| (f) Depends on the language | |
| (g) I will watch it fully depending on its pace | |

METHOD AND SYSTEM FOR PERSONALIZED RECOMMENDATION MODELING

BACKGROUND

Recently, the proliferation and popularity of media content delivered over telecommunication networks and available to viewers has drastically increased. The ability to stream large collections of media content from multiple sources (such as cable television, satellite television, Internet Video-On-Demand services, home media centers, etc.) onto a television has led to an excess of available viewing material and a resulting surfeit of viewing choices available to a viewer. This can lead to the traditional practice of "channel "surfing"—that is, sequentially (or even randomly) traversing a series of streaming television channels—to further include traversing lists of recorded television and Video-On-Demand ("VOD") offerings. This behavior can lead to inefficiency and user frustration, due to potentially missing a critical point in a television program or lengthy delays between programs of user interest. Unfortunately, existing methods for personalizing television programming via program recommendations fail to capture individual user preferences as this requires the need for logging individual television usage history. Collecting individual television usage history can be a very challenging task and typically, most efforts at logging television usage history have been performed by requesting the user to manually enter the programs the user has watched. However, not only is this usually insufficient to comprehensively model the user's interests, the process can also be inaccurate (due to small sample sizes) and/or burdensome on the user to manually maintain such logs.

In contrast, web personalization by mining usage logs for modeling a user's personal taste has been widely applied in personalization of web sites. Web personalization is the process of customizing a web site according to the needs or preferences of specific users by leveraging the knowledge acquired from the analysis of the user's recorded navigational behavior (usage data) in correlation with other information collected in the Web context, namely structure, content and user profile data.

Web site personalization is mostly performed at the web site server. This makes maintaining consistent aggregate individual logs difficult to collect and manage as the user can access the site from different machines, each with different Internet Protocol ("IP") addresses and Media Access Control ("MAC") addresses. As a solution to this problem, certain websites require the user to create and maintain personal accounts on their sites to benefit from their personalized services. However, as the web site usage logs are typically stored at the server, this can raise privacy issues and the usage of which may be undesirable for a user. Furthermore, even though such web sites can offer some level of personalization, it cannot be done across all websites as different websites may have different content management, authentication, and customization techniques. Naturally, this also serves as an obstacle to applying website personalization tools to television viewing, as these same personalization tools would not be able to be directly applied to usage logs of television viewing from multiple sources and content providers.

Moreover, usage statistics and patterns mined from web logs would be significantly different from television usage logs as the nature of content viewed on television can vary—viz, linear (scheduled content), Video On Demand ("VOD"), Live, Previously Recorded Content, etc., whereas web content is almost entirely at least capable of being delivered on demand. For example, linear television show programs are aired according to a schedule and the user may not have watched the content from the beginning, or the user's viewing progress may not be up to date with the program's current airing. The user's actual interest in the program then, can be significantly different from that of a VOD show, even though the user may have consistently watched both for some time.

As a further distinction, television streams, even though from multiple sources, have a predefined presentation format (e.g., scheduled/VOD/Live, etc.) and meta-data (e.g., series/synopsis/duration, etc.) For television content, the content provider has complete control over how, when and what is shown which facilitates the activity flow to be traceable to help identify personalization traits. Web content, however, is mostly available on-demand and hence with web personalization tools observing time based viewing behavior of television shows may be incomplete. Due to these distinctions, simply applying web-customization tools to television usage would not prove to be an effective means to provide personalized management of television consumption.

SUMMARY

As a solution to the type of problems noted above, this disclosure provides novel methods and systems for modeling a user's viewing profile across multiple sources and content providers.

In an embodiment, a method is provided which allows the dynamic generation of a personalized schedule of recommend programs of available media content. By generating such a personalized schedule, a user is provided with a listing of units of available content (e.g., episodes, live sporting events, television programs) likely to be of interest to the user, thereby largely eliminating the need for channel surfing or other inefficient user behavior to find a program of interest. By dynamically generating a personalized schedule, the user's recent activity, interests, and mood may be reflected so as to provide a listing with greater accuracy and/or timeliness.

According to further embodiments, pre-submitted user input in response to a questionnaire, the user's recorded television usage, the user's previous interactions with the personalized schedule, and contextual data such as external events and social group influences are used to model the probability of a user's interest in available media content. Data output from the model is subsequently arranged to display units of available media content with the highest probabilities of user interest to the user. According to still further embodiments, specific user behavior in previously consumed media content such as a user's selection, a user's consumption, and a user's discontinuation of consumption is tracked, analyzed and used as input.

According to another aspect of the claimed subject matter, a system is provided to implement and execute the method described above. This system includes a display device coupled to a plurality of media content sources (such as a cable or satellite television box, a home media center, etc.) and configured to track a user's viewing history and behavior during television usage. A corresponding computing device, such as a remote computing device, may be subsequently used to display a dynamically generated schedule of recommended viewing choices customized for the user. This remote computing device may be implemented as, for example, a television remote control, smart-phone, laptop computer, tablet, etc. In still further embodiments, a graphical user interface of the remote computing device may display the dynamically generated schedule, as well as receive input from the user through the interface. This input may be tracked and recorded and used as input to generate additional customized schedules.

According to various embodiments, the method described above may be implemented as programmed instructions stored on a computer readable medium, such as memory in a computing device. As a result of the systems and methods described herein, a personalized schedule of recommended content from multiple content sources may be generated for a user based on a data model of the user's viewing profile to assist the user in making adaptive, informed, and positive viewing decisions. As herein described, a "user" may refer to a single individual, or a collection of associated individuals (such as members of a household, a family, a business, a social group, etc.) According to these implementations, while each member of the collective may have a corresponding personal model and separate personalized schedule of recommended content, the collective association itself may also have a customized model and corresponding customized schedule that coexist which cocxists with the models and schedules of the individual members. When conflicts or inconsistencies arise between generated schedules, system rules and/or policies may be applied in these units to determine the priority of the collective "user." For example, if the presence of two or more individuals of a collective association is simultaneously detected, the model of the collective takes precedence. Alternate policy or rule systems may be designed and implemented according to conventional means.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

FIG. 5 depicts a list of exemplary reasons contributing to logged user behavior, in accordance with embodiments of the present disclosure.

FIG. 6 depicts a sample questionnaire to query a user for user-input, in accordance with embodiments of the present disclosure.

DETAILED DESCRIPTION

Figure 1:
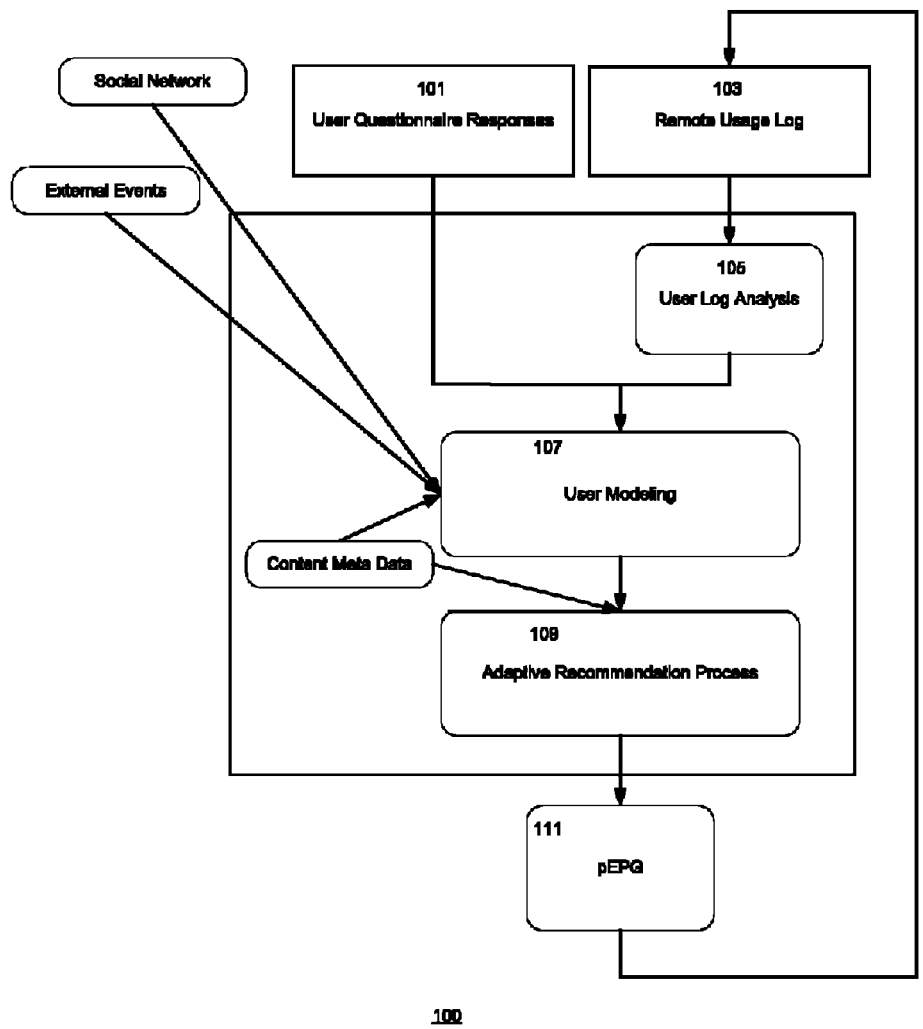
FIG. 1 depicts a data flow diagram of a system for generating a personalized media content schedule for a user, in accordance with embodiments of the present disclosure.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although operations and sequencing thereof are disclosed in a figure herein (e.g., FIGS. 2 and 3) describing the operations of this process, such operations and sequencing are exemplary. Embodiments are well suited to performing various other operations or variations of the operations recited in the flowchart of the figure herein, and in a sequence other than that depicted and described herein.

Some portions of the detailed description are presented in terms of procedures, operations, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed operation, logic block, process, etc., is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the following example configurations are shown as incorporating specific, enumerated features and elements, it is understood that such depiction is exemplary. Accordingly, embodiments are well suited to applications involving different, additional, or fewer elements, features, or arrangements.

Generating Recommended Schedules

FIG. 1 depicts a data flow diagram 100 of a system for generating a personalized media content schedule for a user, in accordance with embodiments of the present disclosure. In particular, FIG. 1 depicts the components involved during a user modeling and content recommendation process.

As depicted in FIG. 1, an adaptive recommendation process is applied to a generated user model to dynamically create a customized program guide with recommendations of available media content for a user. As shown, a user model 107 may take up to two user dependent inputs: a set 101 of user responses to a list of optional preference questions and a remote usage log 103. According to an embodiment, the list of preference questions may comprise a set of single answer or rating-based questions that the user may answer as an initialization step during registration and used as input when creating the user's personal profile. The questions presented to the user may be designed to correspond to general abstract classifications and/or attributes of interest to the user, etc., such that a user's response will provide an indication of the user's particular preference among those interests. Alternatively, when the user elects not to respond to all or a portion of the preference questions, one or more default responses may be automatically entered for the user. In further embodiments, the default response may be automatically selected for the user based on the user-related context, such as the averaged response for social or peer groups associated with the user, and local current events corresponding to the user.

The remote usage log 103 records the usage activities performed which correspond to the display of content in a display device and viewed by the user. These usage activities may include, for example, user interactions with a remote device which selects, deselects, or changes a unit of content consumed, and user interaction with a personalized content schedule generated by the system and presented to the user. The remote usage log is further processed by analyzing the usage log 105 to determine correlations between instances of user behavior—such as a user selection, consumption, and discontinuation of consuming—in connection with of watched programs and distilling the particular reasons which may contribute to the user's behavior, and mapping the correlations to units of available media content.

A user model 107 can be generated with the inputs from the user log analysis 103, and the user input 101 to predict a user's level of interest in units of available media content. In further embodiments, the user model 107 can also take as input meta-data corresponding to the content consumed (i.e., watched) by the user. In still further embodiments, the user model 107 can also consider additional user-based contextual information (e.g., knowledge of external events and information about interests of other users in social groups to which the user belongs). In one embodiment, each input in the user model may be mapped to a unit of available media content by the content's meta-data, and expressed as a value corresponding to the particular input. For example, the user's expressed (or defaulted) preferences in abstract classifications may be mapped to units of available media content with meta-data which corresponds to the classifications and expressed as a value. Likewise, user behavior indicative of a user's interest (e.g., selecting and watching a program) in previously consumed units of media content can be mapped to units of available media content and expressed as another value. Previous interactions with a personalized schedule, external events and social group influences may also be analyzed, data mined for user preferences, mapped to the units of available media content, and expressed as a value indicative of the user's interest in any of the units of available content. The user's interest in a unit of available media content then may be determined by aggregating the values of the mapped inputs of the user model 107 for the unit into a user interest score, for example. These scores may be compiled into a user interest list, which matches the user interest score with the unit of available media content.

An Adaptive Recommendation Process 109 is then applied to parse the list of user interest list to determine the units with the highest calculated user interest score. A smaller list of the units of available media content with the highest calculated user interest scores may be arranged according to a schedule and graphically displayed to the user as a personalized schedule. In an embodiment, the output of the recommendation system is a set or graphical list of shows and programs (VOD, live, recorded, and linear content) presented in the form of a personalized electronic program guide (pEPG) 111 and arranged by the user's predicted interest levels. Interactions with this guide are also indicative of the quality of recommendations provided by the system. These interactions are also fed back as part of the remote usage log to further improve and refine recommendations provided by the system.

Figure 2:
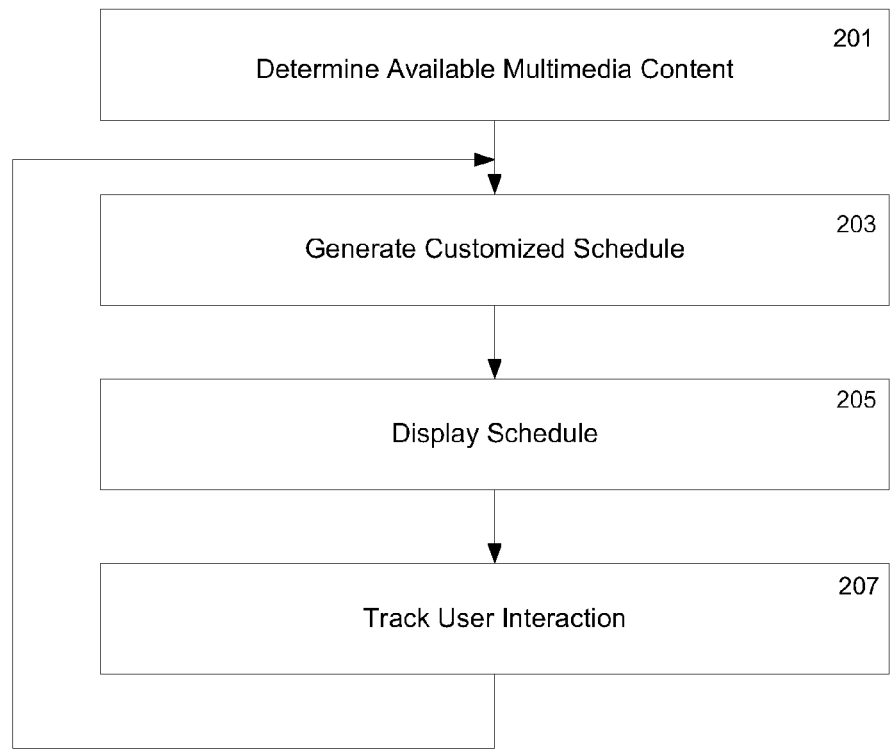
FIG. 2 depicts a flowchart of a process for providing a personalized media content schedule for a user, in accordance with embodiments of the present disclosure.

With reference now to FIG. 2, a flowchart of a process 200 for providing a personalized media content schedule for a user is depicted, in accordance with embodiments of the present disclosure. Steps 201-207 describe exemplary steps comprising the process 200 depicted in FIG. 2 in accordance with the various embodiments herein described. In one embodiment, the process 200 is implemented in whole or in part as computer-executable instructions stored in a computer-readable medium and executed in a computing device.

At step 201, one or more media content sources are referenced to determine available media content. Available media content may consist of, for example, units of content such as movies, television programs, live sports or performances, recorded home videos, etc, that are accessible to the user from a service provider (through user agreements, service plans, licenses, personal ownership, etc.). At step 203, the units of available media content determined in step 201 are evaluated and a customized, recommended schedule of those units is generated for the user. According to an embodiment, the customized schedule is generated by developing a user-specific model using various sources of user-specific information which may include, but is not limited to: (1) user input submitted by the user in response to the initial user preference questions presented during registration, (2) usage logs corresponding to the specific user's tracked consumption of media content, (3) the personalized schedule and program guide (pEPG) interactivity logs, and 4) contextual factors such as external events and social group affiliations which may affect the user's consumption behavior.

For a given candidate unit content—the user model is then applied to the unit and used to predict the user's interest level in the candidate unit. The units may be internally rated and ranked, and units with a relatively high level of predicted user interest may be displayed in the personalized schedule and program guide and presented to the user at step 205. User behavior, e.g., user interaction with the program guide is also tracked for the duration of a user's consumption of media content at step 207. This user interaction is subsequently used to refine subsequent generations of customized schedules and program guides. In still further embodiments, the pEPG may be arranged according to one or more general content topics. In one example, the content topics may include Movies, Sports, Entertainment, Education, and News. The units of content determined to be of relatively high predicted user interest may be distributed among each of the topics in the presentation of the pEPG, according to the meta-data corresponding to the units of content.

As the source of the content can be linear content, recorded content, VOD, streamed-Internet-content, etc., the way the content in the program guide is presented to the user is influenced by the content meta-data and the nature of the content. For example, linear content typically has a fixed schedule whereas VOD can be watched at anytime. Other factors which may influence how and what content is recommended may be extraordinary and infrequent events such as the Olympics, unscheduled events such as natural disasters (and ensuing news coverages), etc., as well as the interests of people in social groups that the user is associated with.

According to further embodiments, usage logging and access to a generated customized schedule may require the identity of the user to be verified by the system, in order to access usage history logs and/or pre-submitted user input corresponding to the particular user, for example. In one embodiment, the identity of the user is verified through a personal, remote computing device or through a graphical user interface displayed on a display device. For registered users, verifying the identity may consist of simply entering authentication information (e.g., a username or account id and a password) corresponding to the user's pre-established identity and/or account through a remote computing device, for example. A new user however, may be requested to register with the system (e.g., submitting identification information), and, once registered, may be prompted to an initial set of preference questions that ask the user about the user's personal choices, interests and other general questions later used to develop the data model used to generate the customized schedule of recommended viewing options for the user. A user who opts to skip answering all or portions of the questions may have default answers inferred for the user based on information known in the system corresponding to the user. For example, the user's geographic location, age, gender, ethnicity, etc., may be registered and stored during a previous registration step. The expressed preferences of other user's with similar or identical personal information may be referenced and used as a default inferred answer for the user. Once the user's identity is established, recording of the user's activity (e.g., tracking of the user's usage of the remote device 101 and content watched in the display device 103) begins.

Figure 3:
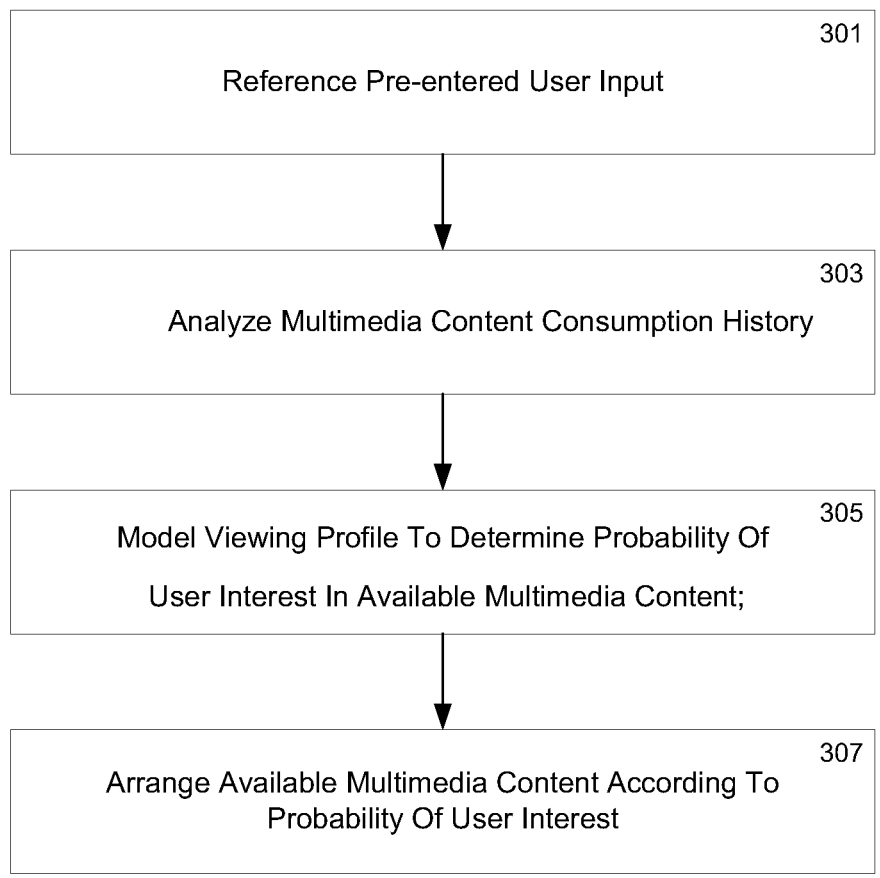
FIG. 3 depicts a flowchart of a process for dynamically generating a schedule of recommended available media content, in accordance with embodiments of the present disclosure.

With reference now to FIG. 3, a flowchart of a process 300 for dynamically generating a schedule of recommended available media content is depicted, in accordance with embodiments of the present disclosure. Steps 301-307 describe exemplary steps comprising the process 300 depicted in FIG. 3 in accordance with the various embodiments herein described. In one embodiment, process 300 is performed during step 207 of process 200 described above.

At step 301, pre-entered user input (if available) is referenced from the user's viewing profile. According to some embodiments, where pre-entered user input is not immediately available or when the user opts against supplying user preference input, a schedule of recommended available media content may still be generated for the user by the process 300 by omitting this step and proceeding directly to step 303. Alternatively, user preferences may be automatically attributed to the user's viewing profile according to user-specific information which corresponds to the preferences of other similar users, as described above with respect to FIG. 2. According to these embodiments, the preferences for the users may be subsequently updated at any time based on supplied user input. According to an embodiment, to obtain the user input, the user is prompted to respond to some general questions (in the form of a questionnaire) about the user's preferences for certain topics. These topics may include, for example, real world activities and objects. According to further embodiments, other questionnaires may be presented to the user for user input periodically to update the user's profile with current information provided by the user. The user input corresponding to the questionnaire(s) is subsequently referenced at step 301 and used to generate the user's viewing profile by mapping the user's preferences to a fixed set of abstract classifications, with a set of preference weights that indicates a measure of the preference of the user for a particular abstract classification. A list of abstract classifications that indicate the user's preference for movies may include, for example, "genre," "cast," "director," "language," "rating," etc. Each classification can have one or more corresponding attributes from a finite set of attributes indicating the preference of the user for those attributes. For example, the abstract classification "genre" can take one or more values that include (but are not limited to): "comedy," "action," "romance," "horror," sci-fi," etc.

According to some embodiments, each unit of media content has a corresponding one or more instances of meta-data which specifically correlate to similar classifications. For example, an unit of a media content (such as a movie) may include the name of the director and one or more starring actors. According to further embodiments, the meta-data of an unit of media content corresponds specifically to one or more abstract classifications and/or one or more attributes, allowing an unit of media content to be mapped to the user's preferences in the user's profile. If a specific attribute or abstract classification is repeatedly encountered, its corresponding weight will increase significantly and this can influence the user's interest in other attributes. Additional considerations that may influence a user's viewing profile can include the times of day and days of week of logged usage activity. Any repeatedly encountered variables or attributes of consumed media content may also be considered, according to various embodiments. The user's interest in a candidate unit of media content may thereafter be predicted by finding the similarity of the meta-data of the candidate unit of media content to the user profile over all classifications, and the weight of the user's preference in the corresponding applications. In one embodiment, the user's interest in a unit of candidate content that is calculated from the user's pre-entered (or pre-supplied) input may be expressed as a value (e.g., a user preference value) that accounts for how many classifications or attributes of a unit of available media content (given by its meta-data) match the classifications or attributes in the user's profile, and the magnitude (weight) of the user's preference for those classifications or attributes. In further embodiments, the weight assigned to an abstract classification or attribute may be disproportionately allocated so as to weight recent activity more heavily than less recent activity. In other words, the weight assigned indicating a user's interest in an abstract classification or attribute may decay over time within the system. In this way, the interest of a user—expressed as a value—based on the user's preferences in certain abstract classifications and attributes may be used as input to model the user's viewing profile.

According to still further embodiments, the user's viewing profile can also influenced by current contextual information corresponding to the user. One source of contextual information is external events. Generally, a user's viewing choices are greatly influenced by the events (globally and locally) that are happening to or around the user. For example, when an international event such as the Olympics is going on, most people with an interest in sports tend to watch the Olympics on television. Even if a user's specific interest in sports may not be known, it is highly likely that the user will choose to watch the Olympics at some point. Naturally, the recommendation for a sports fan or in the sports category of a user's pEPG may be highly influenced by an external and/or extraordinary events such as the Olympics.

To evaluate the influence of external events on user interest, recent news articles are collected. Sources for these news articles may comprise, for example, Internet news websites, or other wired news feed services. The news articles collected may be further classified into corresponding categories and analyzed to determine a level of coverage (e.g., a frequency of reporting or occurrence in news and social media sites). These categories may include, for example, sports, entertainment, politics, science/technology and health. Next, keywords from the news articles are extracted, especially from the news stories that have high coverage. The keywords extracted may consist mostly of people's names, events, organizations, places, etc., for example Since candidate units of media content are described by a set of abstract classifications, which in turn may include a set of attributes, which are themselves the equivalent keywords, this allows the mapping of current events to units of media content by finding matches and/or similarities between keywords. Other methods to obtain external or current events may include determining trending topics in news websites, social networks, social interest aggregating websites and applications, or those specified by a user or operator of the system—typically within specified periods of time (e.g., breaking news bulletins). Once it is determined that some external events have a high similarity with contents, the weighted interest of the user in the abstract classifications corresponding to the units of available media content may be updated based on the popularity of the external event measured as a function of the coverage of the event, which influences the weight on the keywords. This may also be seen as one component of the recommendation initialization strategy with a stronger influence when the user registers without answering any questions.

Similar to external events, interests of a social group affiliated with the user can affect the user's viewing preferences. A user's viewing choices, for example, are greatly influenced by the viewing decisions and habits of the user's friends, relatives, and like-minded individuals, each a social group in which the user belongs and collectively, the user's social network. Even more specifically, a social group can refer to:

A group of people with whom the user is presently consuming television. Namely, the exact group of people who are geographically and proximally located or consuming television together. In general, influence of this group is more circumstantial.

A group of people who know each other (and the user) and frequently communicate and share information with each other, namely, friends on social media. Generally, influence of this group is more significant, particularly depending on the degree of communication activity. The effect is spread across multiple categories of content.

One or more people with extraordinary influence on the user's viewing interests. These people may include celebrities or other notable people with whom the user has demonstrated an association (even if unilaterally).

Groups of people who come together with a common interest. e.g., special interest groups like a group of movie lovers, soccer enthusiasts etc. In general, the influence of this group is more localized/focused on items of common interest.

Members of a household who generally watch television together, namely, family members. The influence of this group could be circumstantial and affect specific classifications only.

A group of people who have a common sense of belonging, e.g., for a community and country. Influence of this group affects areas where the common sense of belonging is involved.

Depending on the group(s) the user belongs to, the popularity of a content with respect to the user is rated. The process of rating a content based on the user's group affiliation(s) is similar to that of external events, except that ratings of the content is affected by the preferred classifications of other users instead of a list of keywords from external events. Thus, for example, the contextual influence awarded to a social group interest may be derived by determining which social groups are affiliated with the user, calculating the interest level of the social groups in units of available media content, weighting the social groups by the estimated level of influence on the user, and rating the units of media content by applying the weighted influence of a social group interest to the rating of an unit of the media content, or by adding the weighted interest of corresponding social groups to the user's preference value derived for a unit of available content. Since social groups can be explicit (when the user has indicated his belonging to a group explicitly) and implicit (grouping users based on age, gender, social status, ethnicity etc), interests of implicit social groups may also be used for initializing preference weights of abstract classifications. According to one embodiment, this may have a stronger influence on the initialization of content recommendations when the user has not answered the questions on preference for abstract classifications while registering.

At step 303, the user's history of consumed media content and user interface usage log are analyzed to observe patterns and record statistics, which are subsequently mapped to units of available media content and used to predict the user's interest in the units of available media content. The system logs and stores every interaction and behavior the user has through the user interface, including what channel/show the user is watching, which source the user is watching (e.g., cable, internet, etc), what show the user recorded, the user's channel surfing or browsing behavior, likes/dislikes etc. In one embodiment, the log of the remote computing device is analyzed to distill user behavior among a set of three distinct acts—1) a user's selection of an unit of media content, 2) a user's continuous consumption of the media content once selected, and 3) the user's discontinuation of consumption of the media content. According to an embodiment, a user's interest in consumed media content is determined by evaluating the following factors:

1. The reasons behind why the user selected the content.
2. The reasons behind why the user continued to watch the content for time 't'.
3. The reasons behind why the user discontinued watching the unit of content.

According to further embodiments, these factors may be inferred by considering indications of a user's behavior. Indications about the user's interest (or disinterest) in a content could be either explicit or implicit. Explicit indications are those that are made clear either by the user (e.g., manually indicating like or dislike etc), or inferred based on known behavior traits. On the other hand, implicit indications are those which are inferred from the usage logs based on statistics, rules or other data mining techniques. According to some embodiments, implicit indications are weighed less in terms of their influence on user interest. However, most of the information available in logs is mainly implicit, which makes their contribution significant.

The probability of each user behavior, that is, selection, consumption, and discontinuation, for an unit of media content watched by the user may be determined by considering the combined weights of each indication corresponding to the behavior for that unit. Relatively many and/or heavily weighted indications would therefore suggest a high probability of a user behavior. Once user behavior for consumed content is modeled, the behavior may be mapped to related units of available media content to predict user interest (e.g., as a value). For example, content that shares similar meta-data characteristics, content that was recorded, the same unit of content that was viewed in the past on multiple occasions, etc. may be mapped together. In this way, the interest of a user in a candidate content based on the user's historical consumption and user behavior history may also be used as input to model the user's viewing profile. In one embodiment, the interest of the user in a candidate content based on the user's historical consumption and behavior history may be expressed as a value—such as a user behavior value—indicative of the user's predicted interest in a unit of candidate media content.

As the user uses the system by selecting and watching content, the user's profile will be updated according to the proximity of the content's meta-data with the user's present profile. Once the system 100 begins to recommend some content, the system is then able to benefit from the feedback that the user provides while using the recommended schedule and personalized electronic program guide (pEPG) corresponding to the user. For example, an exemplary pEPG interface may allow the user to view and select, delete and add VOD or cable/satellite show to a time-line based electronic program guide. According to such an implementation, the operations performed by the user which are recorded may include, (1) Select, (2) Switch to another content, (3) Delete a content, (4) Add a content, (5) Like, (6) Dislike, (7) Share a content, and (8) View the unit of media content's trailer/synopsis. These operations applied to content actually viewed affect the user profile which is updated for every such interaction. In this way the interest of a user in a candidate content based on the user's interactions with the pEPG framework is also used as input to model the user's viewing profile. In one embodiment, the interest of the user in a candidate content based on the user's interactions with the pEPG framework may be expressed as a value—such as a user-initiated operations value—indicative of the user's predicted interest in a unit of candidate media content.

At step 305, the user's viewing profile is modeled from the pre-entered user input (if available) entered at step 301, and the user log analysis performed at step 303 to determine the probability of a high level of user interest in units of available media content. Total User Interest in a candidate unit of media content may thus be computed by combining the user's computed interest in abstract classifications and/or attributes which correspond to meta-data of the candidate unit (as performed in step 301), the interest of a user in a candidate content based on the user's historical consumption and user behavior history), and the interest of a user in a candidate content based on the user's previous interactions with the pEPG. In one embodiment, the values corresponding to each of these user interests may be combined for a total user interest score. For example, the user behavior value, user preference value (which may be influenced by contextual influence values of external events and/or associated social groups) and user operations value calculated from the analyses performed at steps 301 and 303 for a unit of available media content may be combined as a raw user interest score for the unit of available media content.

The units of media content with meta-data most proximate to the preferred abstract classifications and attributes, and with the highest level of predicted user interest based on analyzed usage logs (e.g., the highest rated unit of available content) are selected for display in the pEPG. Proximity of media content to a user profile may be determined using a nearest neighbor (NN) approach and taking the top-N (as selected by the user or formatted for display) results. The nearest neighbor distance measure is an adaptive weighting measure that is a function of the users' weighted interest in abstract classifications and his preferred abstract classifications. The top-N results may be thereafter displayed (e.g., as a list) in the pEPG generated in the user's remote device at step 307. Alternately, instead of displaying a list of results, the content may be arranged as an information stream or "content feed" to the user. According to such an implementation, the user may indicate "next" to go from one unit of content in the content feed to the next. In still further embodiments, conventional "channel up/down" functionality may be adapted to instead allow a user is able to navigate between "previous" and "next" units of content, thereby prompting further user input comprising user selections which may be used to further update the user's profile. As the updated profile of a user is greatly influenced by his present profile at any time instant, this provides the ability to dynamically generate timely schedules and program guides to reflect the user's current preferences and tastes.

Figure 4:
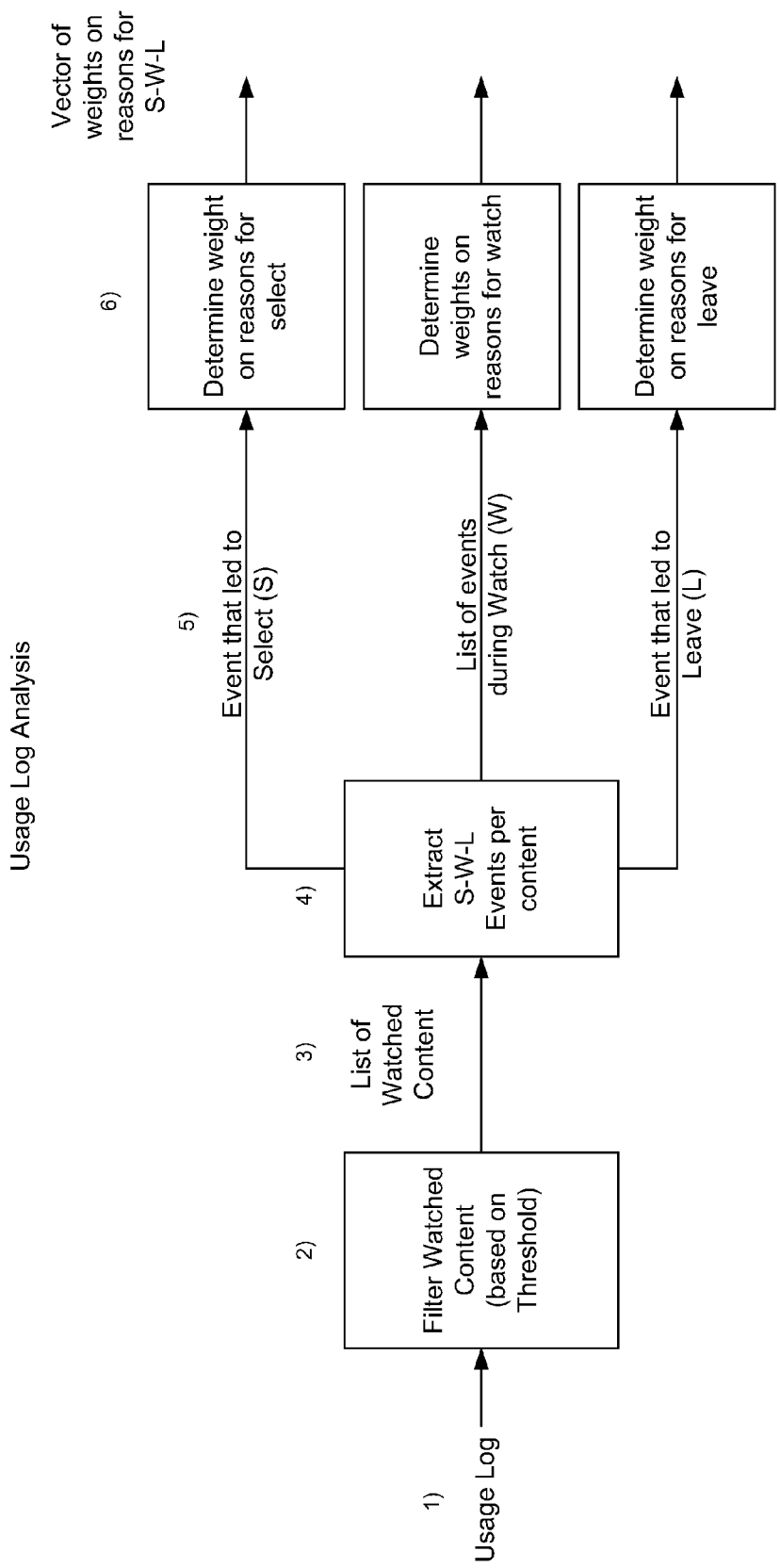
FIG. 4 depicts a data flow diagram of a process for performing usage log analysis, in accordance with embodiments of the present disclosure.

With reference now to FIG. 4, a data flow diagram 400 of a process for performing usage log analysis in a system is depicted, in accordance with embodiments of the present disclosure. At time 1), a usage log for a user's viewing history is received. The user's viewing history may be obtained by, for example, referencing the user's usage logs in a data repository corresponding to the system. At time 2), the user's usage viewing history may be filtered to remove content that the user did not consume (i.e., watch) below a threshold duration. By filtering the content below a certain threshold, insignificant noise due to user "zapping" or "channel surfing" may be eliminated to reduce or remove inaccurate effects to the user's recorded behavior. At time 3), the filtered list of consumed content is compiled, and reasons (e.g., events or indications) corresponding to identified user behavior is extracted at time 4). As depicted, user behavior is identified within the system as either select, watch, or leave, and contributing reasons may be mined (at time 5) from events which occurred during each of the user behaviors for any unit consumed. At time 6), each of the reasons contributing to a user behavior may be weighted according to nature of the particular reason, event, or indication. For example, explicit reasons may be afforded greater weight than implicit reasons. These weights may be applied to available media content to determine a unit of content's rating, representing a user's predicted level of interest, as described above with respect to FIG. 3, for example.

FIG. 5 depicts a list 500 of exemplary reasons contributing to logged user behavior, in accordance with embodiments of the present disclosure. These reasons (which comprise events or indications) are described in greater detail above with respect to step 305 of FIG. 3, and may be extracted from usage history for a unit of media content as described above with respect to FIG. 4. As presented in list 500, each of the identified user behaviors (e.g., Select, Watch, and Leave) has a corresponding plurality of reasons which, if occurring during the performance of any of the user behaviors, may have contributed to the user's performance of the particular behavior. Cross-referencing a user's individual act with a user's usage history then, may create or reinforce an association between the act and a particular reason. For example, a user who selects to watch a program that the user's usage history indicates the user consistently watches the same, regularly scheduled program at its scheduled day and time (e.g., S4) may indicate (and corroborate) the reason for the user's selection. During a usage log analysis process, past user behavior and usage history may be filtered and extracted to determine reasons for a particular user behavior which occurred during instances of the identified user behavior. As shown in FIG. 5, each reason is further indicated as either Explicit or Implicit. Certain embodiments may allocate greater weight to explicit reasons as opposed to implicit reasons. Accordingly, these reasons may be mapped or applied to units of available content, and the corresponding weights of the reasons may be factored when assigning a value or rating for a particular unit of programming which represents the user's predicted level of interest.

FIG. 6 depicts a sample questionnaire 600 to query a user for user-input, in accordance with embodiments of the present disclosure. As depicted in FIG. 6, a user may be prompted with a list of questions, the user's responses of which correspond to classifications and may be used to infer a user's interest to content with meta-data similar or equal to those classifications. This way, a user's indicated, explicit interests or preferences in other activities may be used to model the user's likely preference of media content. User response to a list of questions, such as sample questionnaire 600, may be used in the system and referenced during the creation of the user model.

Exemplary Media System

Figure 7:
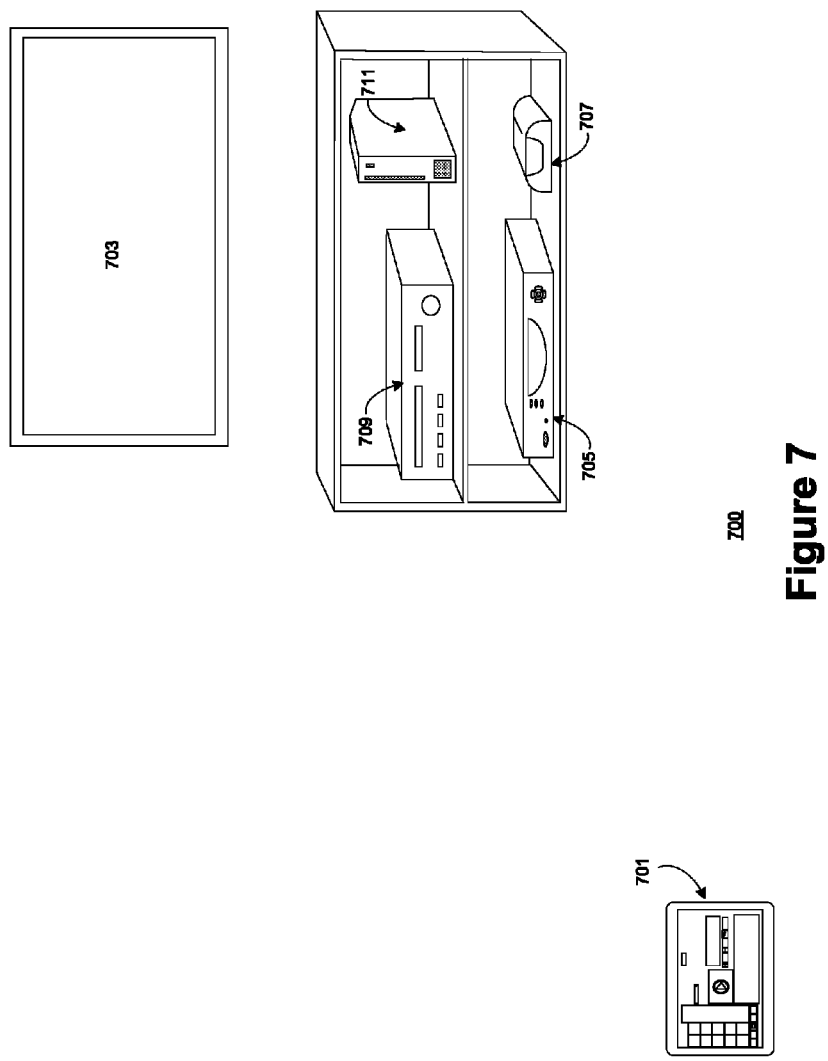
FIG. 7 is a depiction of an exemplary system for generating a personalized media content schedule for a user, in accordance with embodiments of the present disclosure.

With reference now to FIG. 7, an exemplary system 700 for generating a personalized media content schedule for a user is depicted in accordance with embodiments of the present disclosure. According to an embodiment, system 700 includes a display device 703, and a plurality of media content sources (e.g., content sources 705, 707, 709, and 711) communicatively coupled to the display device. The system 700 may be implemented to develop a recommendation system that can generate a recommended guide and schedule for viewing programs across multiple sources of content (705, 707, 709, 711) on the display device 703 based on knowledge of a user's viewing interests. The user's viewing interests are modeled based on analyzing the user's television usage logs, responses to a personalized questionnaire, and content meta-data. The display device 703 may be implemented as, for example, a television, monitor, or projector screen, etc. The media content sources may include, but are not limited to, a cable or satellite receiver 705, a set top box 707, a home media center 709, and a video game console 711.

According to one embodiment, the media content sources may be coupled to, and configured to provide content from a plurality of media content providers, such as a cable television service, a satellite television service (both including live, recorded, scheduled, and VOD content), and VOD content over the Internet. According to an embodiment, the display device 703 is operable to display the content provided by the multiple sources (705, 707, 709, 711) connected to it—such as cable and satellite television, personal video recorders, Internet etc. Other content suitable for display within the display device may include downloaded electronic copies of content stored both locally (e.g., the same machine or local media storage device) and remotely (e.g., on a remote or cloud server).

As depicted, FIG. 7 further includes a remote or personal computing device 701, which may be implemented as a tablet computing device (as shown), laptop, smart-phone, or a remote control of the television or content source. The display of a personalized media content schedule generated by the system 700 may be displayed to the user in a graphical user interface of the remote computing device 701. In still further embodiments, multiple, simultaneous viewers of the same display device 703 may each have a different remote computing device 701, each generating and displaying an individually personalized media content schedule for the corresponding user. The system 700 allows every user to control the television and connected devices with a software application executing on the user's personal device 701.

Alternately, multiple viewers may share a single remote or input device 701 capable of generating a personalized media content schedule for each user. To access functionality of the system 700, the remote 701 may require the user to verify the user's identity, such as by entering an account name and password or establishing a new identity with those parameters, or to select pre-established accounts and/or identities. For example, a remote device 701 may be configured with a plurality of selectable user identities. To begin tracking of user viewing history and to enable the generation of personalized content schedules, a user simply acknowledges an identity with the remote device 701 through software (accessible through a graphical user interface, or via user actuation of a physical button, for example).

Every user's television usage activity is logged by the system 700. Examples of usage activity logged by the system for each user may include the specific units of content consumed during a usage session, the corresponding durations of each unit consumed, the order in which the units of content were consumed (viewed). According to one embodiment, a set of recommended programs are identified which is recommended to the user in a schedule. In one embodiment, the schedule is implemented as one or more time-lines. This recommendation—referred to herein as a personalized electronic program guide (pEPG)—may be displayed in a graphical user interface, such as a display of the remote device 701. Alternately, the pEPG may also be displayed in the display device 703, accessible on-demand to the user. The user's responses and interactions to this recommendation is also logged (e.g., the user can chose to delete or add shows to the time-lines). By allowing each viewer the usage of a remote computing device 701 during media consumption on a television, additional usage data (e.g., media consumption history and usage behavior history) may be collected, analyzed, and the schedule may be updated dynamically for each user.

Logging of the usage activity, analysis of logged usage activity, and the generation of the pEPG may be performed together or separately by any one of a plurality of software instances executing in the devices comprising system 700, in accordance with various embodiments. For example, any or all of the functionality may be performed by software executing in the remote device, the display device, a local computing device or media content provider (e.g., a cable box, home media server), or even a remote computing device (remote server) communicably coupled to any of the above devices.

Exemplary User Interface

Figure 8:
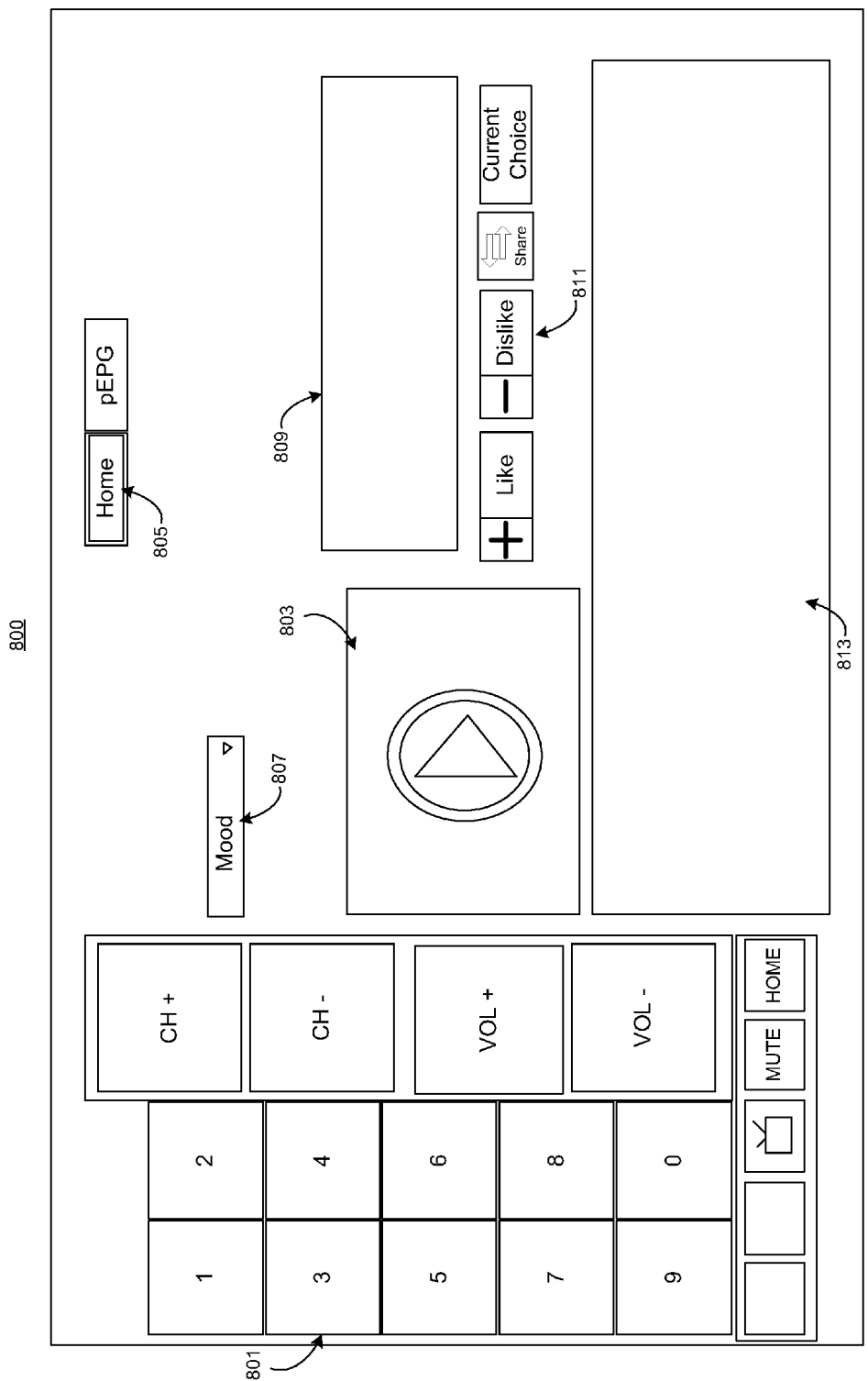
FIG. 8 depicts an exemplary graphical user interface of a dynamically generated schedule of recommended available media content, in accordance with embodiments of the present disclosure.

With reference now to FIG. 8, a first exemplary graphical user interface 800 of a dynamically generated schedule of recommended available media content is depicted, in accordance with embodiments of the present disclosure. In one configuration, user interface 800 is generated and displayed in the remote computing device 701 of a system for generating a personalized schedule of recommended available media content, such as the system 700 described above with respect to FIG. 7. In further embodiments, the user interface 800 may be displayed directly in the display device 703, but operated by the remote computing device 401. In one embodiment, graphical user interface 800 represents the interface depicted when a display device is turned off, and the display of the pEPG is activated.

As presented in FIG. 8, user interface 800 includes functionality for operating a display device (e.g., display device control panel 801), functionality to preview selected or recommended content in a scheduled timeline (e.g., preview display area 803), a plurality of content displays 809, 813 which provide information on selected or recommended content, and a plurality of user-input fields which may be graphically implemented as, for example buttons, fields, menus, knobs, etc. (e.g., user input menu 807; window button 805, and user preference indicators 811). In one embodiment, operation of a display device may be performed in the control panel 801. As depicted, control panel 801 includes buttons for numeric input (e.g., during channel selection), buttons for incrementing and decrementing the channel selection and volume, and other pre-programmed functionality, such as "mute," and "home." In one embodiment, the preview display area 803 is operable to display a selected unit or portion of an unit of media content. Content displays 809 and 813 may display specific information corresponding to the selected unit and/or provide additional external context. For example, content display 809 may display information or an introduction to the unit of media content being previewed in display area 803. Meanwhile, content display 813 may display news headlines corresponding to current events.

The user interface may include functionality to receive user input. For example, User preference indicators 811 may be used to indicate a user's preference for the selected unit of media content. As shown, user preference indicators 811 include a plurality of buttons (e.g., "Like," "Dislike," Share"), and an information field (e.g., "Current Choice"). A user is able to indicate the user's appreciation and/or interest in the selected unit of media content by actuating any of the plurality of buttons. User actuation of buttons are logged and used to update the model of the user's viewing profile. For example, user actuation of the "Like" button may increase the weight of the abstract classification and/or specific attributes of the selected unit of content, as well as increase the weight of certain indicators. Conversely, user actuation of the "Dislike" button may have the opposite effect. User actuation of the "Share" button may publish, via one or more connected social network applications the user's choice. Once either the "Like" or "Dislike" buttons are actuated, the user's most recent choice may be presented in the "Current Choice" information field. In alternate embodiments, the user may be able to toggle the display of content in the user interface 800. The display of content in the user interface 800 may display the content of the pEPG, as described above.

By using any of the systems or methods provided above, a customized schedule of recommended content from multiple content sources may be dynamically generated for and presented to a user based on a data model of the user's viewing habits and usage history, explicit input, and content meta-data to assist the user in choosing between a plurality of viewing options. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a personalized media content schedule for a user, the method comprising:
   determining, in a processor of a computing device communicatively coupled to a display device, a plurality of units of available media content from a plurality of content sources;
   dynamically generating a schedule of recommended units of available media content from the plurality of units of available media content, the schedule being customized for a user of the display device;
   displaying to the user a graphical display of the schedule of recommended units of available media content, the display comprising an ordered listing of a plurality of recommended units from the schedule of recommended units of available media content arranged according to a relative predicted level of user interest in each of the plurality of units of available media content; and
   tracking user interaction with the schedule of recommended available units of media content,
   wherein the schedule of recommended available units of media content is customized for the user by generating a viewing profile for the user based at least on a plurality of past instances of user behavior corresponding to units of media content previously consumed by the user and mapped to the units of available media content,
   further wherein the viewing profile is used to predict the relative level of user interest in each of the plurality of units of the available media content by assigning weighted values to a plurality of extracted reasons contributing to the past instance of user behavior, and identifying a past instance of user behavior with the greatest weighted sum of values.

2. The method according to claim 1, wherein generating the viewing profile of the user comprises modeling a viewing profile of the user based on a referenced user input, a media content consumption history, and a plurality of previous user interactions with a plurality of previously generated schedules of recommended available media content.

3. The method according to claim 2, wherein modeling a viewing profile based on the media content consumption history comprises:
   tracking user behavior patterns exhibited by the user corresponding to the units of media content previously consumed by the user; and determining user behavior values corresponding to the plurality of units of available media content based on a comparison between the plurality of units of available media content with the units of media content previously consumed by the user.

4. The method according to claim 3, wherein determining a user behavior value corresponding to a unit of available media content comprises:
mapping the unit of available media content to the units of media content consumed by the user corresponding to the plurality of past instances of user behavior;
predicting an instance of user behavior corresponding to the unit of available media content; and
calculating the user behavior value for the unit of available media content based on the predicted instance of user behavior for the unit of available media content.

5. The method according to claim 4, wherein mapping the unit of available media content to the units of media content consumed by the user comprises:
filtering the user behavior patterns to identify a plurality of past instances of user behavior performed by the user;
extracting reasons contributing to the plurality of past instances of user behavior from the units of media content corresponding to the plurality of past instances of user behavior; and
mapping the reasons for the plurality of past instances of user behavior to the plurality of units of available media content.

6. The method according to claim 1 wherein the plurality of past instances of user behavior comprise:
past instances of a user selection of a unit of media content;
past instances of a user consumption of a unit of media content; and
past instances of a user discontinuation of a user consumption of a unit of media content.

7. The method according to claim 6, wherein the reasons for the plurality of past instances of user behavior comprise:
a) a group of reasons corresponding to a user selection of the unit of media content;
b) a group of reasons corresponding to a user consumption of the unit of media content; and
c) a group of reasons corresponding to the user discontinuation of a user consumption of the unit of media content.

8. The method according to claim 7, wherein each group of reasons a), b), and c) comprises a plurality of indications of a user interest in a unit of media content, the plurality of indications comprising either an implicit indication or an explicit indication.

9. The method according to claim 1 wherein identifying a past instance of user behavior with the greatest weighted sum of values comprises:
calculating a weighted sum of values for each past instance of user behavior mapped to the unit of available media content from the weighted values of the reasons corresponding to the past instance of user behavior; and
comparing the weighted sum of values of each past instance of user behavior corresponding to the unit of available media content.

10. The method according to claim 2, wherein modeling a viewing profile of the user based on the referenced user input comprises referencing pre-entered user input corresponding to preferences of the user in a plurality of abstract classifications.

11. The method according to claim 10, wherein the plurality of abstract classifications are comprised from a fixed set of abstract classifications, each abstract classification from the fixed set of abstract classifications comprising a plurality of attributes from a fixed set of attributes.

12. The method according to claim 11, wherein each abstract classification from the fixed set of abstract classifications is assigned a weighted value.

13. The method according to claim 12, wherein modeling a viewing profile of the user based on the referenced user input comprises:
mapping the plurality of units of available media content to the fixed set of abstract classifications; and
determining a plurality of user preference values for the units of available media content based on the weighted values of the abstract classifications mapped to the units of available media content.

14. The method according to claim 13, wherein modeling the viewing profile is further based on determining contextual influence values corresponding to the units of available media content, the contextual influence values being comprised from a group consisting of: external event values and social group interest values.

15. The method according to claim 14, wherein determining contextual influence values of external events corresponding to the units of available media content comprises:
collecting a plurality of external events occurring within a window of time;
categorizing the plurality of external events among a plurality of pre-set categories;
deriving a plurality of weighted values of the plurality of external events based on predicted levels of interest of the user in the plurality of external events;
mapping the plurality of external events to units of available media content by comparing a plurality of abstract classifications corresponding to the units of available media content to the pre-set categories corresponding to the plurality of external events; and
determining a contextual influence value of external events for the units of available media content based on the derived plurality of weighted values corresponding to the plurality of external events mapped to the plurality of external events.

16. The method according to claim 14, wherein determining contextual influence values from social group interest values for the plurality of units of available media content comprises:
determining a plurality of social groups corresponding to the user;
calculating an interest level of each of the plurality of social groups in the units of available media content;
deriving a plurality of weighted values of the plurality of social groups corresponding to the user according to a level of influence on the user of each of the plurality of social groups; and
determining a contextual influence value of social group in events for the units of available media content based on the interest levels of the plurality of social groups in the units of available media content and the levels of influence on the user of the plurality of social groups.

17. The method according to claim 2, wherein modeling a viewing profile of the user based on the plurality of previous user interactions with a plurality of previously generated schedules of recommended available media content comprises:

tracking user interactions with the plurality of previously generated schedules of recommended available media content;

filtering the user interactions to identify a plurality of user-initiated operations and units of media content consumed by the user corresponding to the plurality of user-initiated operations;

assigning weighted values to the plurality of user-initiated operations;

mapping the units of available media content to the units of media content consumed by the user corresponding to the plurality of user-initiated operations; and calculating a plurality of user operations values for the units of available media content based on the weighted values of the plurality of user-initiated operations mapped to the units of available media content.

18. The method according to claim 17, wherein the predicted level of user interest corresponding to a unit of available media content comprises an aggregate value comprising a calculated user behavior value, a determined user preference value, and a calculated user operations value corresponding to the unit of available media content.

19. The method according to claims 18, wherein the aggregate value further comprising the contextual influence values corresponding to the unit of available media content.

20. The method according to claim 12, wherein the value attributed to an abstract classification corresponding to recent user activity is weighted more heavily than the value attributed to an abstraction classification corresponding to less recent user activity.

21. The method according to claim 12, wherein the value attributed to an abstract classification corresponding to frequently repeated user activity is weighted more heavily than the value attributed to an abstraction classification corresponding to less frequently repeated user activity.

22. A system for providing a personalized media content schedule for a user, the system comprising:
a display device;
a receiver, communicatively coupled to the display device, and configured to receive a media content from a plurality of content providers for the display device;
a control device corresponding to a user and communicatively coupled to the display device and operable to track an operation of the display device,
a computing device, communicatively coupled to the control device and configured to dynamically generate a customized schedule of recommended media content from the plurality of content providers for the user from a plurality of units of available media content from the plurality of content providers,
wherein the schedule of recommended media content comprises a plurality of units of recommended media content and is customized for the user using a viewing profile model generated for the user, based at least on a plurality of past instances of user behavior corresponding to units of media content previously consumed by the user and mapped to the units of available media content,
further wherein, the viewing profile is used to predict the relative level of user interest in each of the plurality of units of available media content by assigning weighted values to a plurality of extracted reasons contributing to the past instance of user behavior, and identifying a past instance of user behavior with the greatest weighted sum of value.

23. The system according to claim 22, wherein the available media content from the plurality of content sources is comprised from a group of media content including:
cable television content;
satellite television content;
Video on Demand services;
recorded television content;
live television content;
stored, electronic user-generated content; and
digital content streamed over the Internet.

24. The system according to claim 22, wherein the computing device is further operable to:
query the user for user input corresponding to preferences of the user in consuming multimedia content;
store the user input corresponding to preferences of the user in consuming media content, wherein the user input corresponding to preferences of the user in consuming multimedia content is referenced to generate the viewing profile model of the user; and
determine a plurality of user preference values corresponding to the plurality of units of available media based on a plurality of abstract classifications mapped to the units of available media content and corresponding to preferences of the user in consuming media content.

25. The system according to claim 22, wherein the computing device is further operable to:
track user behavior patterns exhibited by the user corresponding to units of media content consumed by the user; and
determine a plurality of user behavior values corresponding to the plurality of units of available media content based on a comparison between the plurality of units of available media content with the units of media content consumed by the user.

26. The system according to claim 22, wherein the computing device is further operable to:
track user interactions with the previously generated schedules of recommended available media content;
determine a plurality of units of user-consumed content corresponding to the user interactions with the previously generated schedules of recommended available media content;
map the units of available media content with the plurality of units of user-consumed content corresponding to the user interactions with the previously generated schedules of recommended available media content; and
calculate a plurality of user operations values corresponding to the units of available media content.

27. The system according to claim 22, wherein the computing device is further operable to:
connect to a plurality of news sources;
collect a plurality of current events from the plurality of news sources;
categorize the plurality of current event according to a plurality of pre-set categories;
determine a plurality of weighted values for the plurality of current events;
map the plurality of current events to the units of available media content; and
determine a plurality of contextual influence values corresponding to the plurality of units of available media based on the weighted values of the plurality of current events mapped to the units of available media content.

28. The system according to claim 22, wherein the computing device is further operable to:
- connect to a social group hub;
- determine a plurality of social groups corresponding to the user;
- determine a plurality of levels of influence on the user of the plurality of social groups corresponding to the user;
- determine a level of user interest of the plurality of social groups corresponding to the user on the units of available media content; and
- determine a plurality of contextual influence values corresponding to the plurality of units of available media based on the plurality of levels of influence on the user of the plurality of social groups corresponding to the user and the corresponding levels of interest in the units of available media content of the plurality of social groups corresponding to the user.

29. The system according to claims 22, wherein the computing device is further operable to calculate a level of user interest in each unit of available media content by aggregating a plurality of user preference values, a plurality of user behavior values, a plurality of user operations values, and a plurality of contextual influence values for the unit of available media content.

30. The system according to claim 22, wherein the viewing profile model is generated based on a media content consumption history corresponding to the user, a referenced user input, and a plurality of previous user interactions with previously generated schedules of recommended available media content schedule of recommended available media content.

31. A non-transitory computer readable medium containing program instructions embodied therein for causing a computing system to implement the provision of a personalized media content schedule for a user, the program instructions comprising,
- program instructions to determine available media content from the plurality of content providers;
- program instructions to dynamically generate a schedule of recommended available media content customized for a user of the display device;
- program instructions to display the schedule of recommended available media content as an ordered listing of a plurality of recommended units from the schedule of recommended units of available media content arranged according to a relative predicted level of user interest in each of the plurality of units of available media content; and
- program instructions to track user interaction with the schedule of recommended available media content,
- wherein the schedule of recommended available units of media content is customized for the user by generating a viewing profile for the user based at least on a plurality of past instances of user behavior corresponding to units of media content previously consumed by the user and mapped to the units of available media content,
- further wherein the viewing profile is used to predict the relative level of user interest in each of the plurality of units of the available media content by assigning weighted values to a plurality of extracted reasons contributing to the past instance of user behavior, and identifying a past instance of user behavior with the greatest weighted sum of values.

32. The non-transitory computer readable medium according to claim 31 wherein the program instructions to dynamically generate a schedule of recommended available media content comprises:
- program instructions to model the viewing profile of the user based on a referenced user input and an analyzed media content consumption history to determine a probability of user interest in each of a plurality of units of the available media content.

* * * * *